United States Patent Office 3,145,093
Patented Aug. 18, 1964

3,145,093
ACIDIC FERTILIZER-CONTAINING SLAG
Harold W. Wilson, P.O. Box 1101, El Paso, Tex.
No Drawing. Filed May 16, 1960, Ser. No. 29,130
9 Claims. (Cl. 71—62)

This invention relates to the production of a fertilizing material for calcareous (alkaline) soils and it has for its special object the provision of a fertilizing material in such form: (1) that the product is not used up or decomposed immediately after being taken into the soil, (2) that the plant nutrients contained therein are released slowly for use of plants growing in the soil, and (3) that the product is non-toxic and beneficial to the soil in more than one manner insofar as it will not merely neutralize alkalinity of the soil because of its acid character, but will add other beneficial results to the one mentioned.

The product in addition is low in cost and is easily applied when used in conventional distribution equipment.

The invention is based on the discovery that slags from a reverberatory copper refining process, when treated with acids, such as sulfuric and phosphoric acid or with a mixture of said acids, in the presence of water, yield a product which has essentially the qualities above enumerated. If chemical fertilizers are premixed with the slag prior to addition of aqueous acid solutions, the products will contain all those plant nutrients which have been added to the slag in their most effective state.

It has already been proposed to use slag derived from an iron refining process as a fertilizer and to treat the slag with just enough dilute acid to dissolve it, so that it can produce plant nutrients, when added to the soil. Further it has been proposed to use very dilute acid solutions in connection with slag derived from an iron refining process in order to dissolve silicic acid and to eliminate gel formation. These proposals provide however for only minor amounts of plant nutrients which are of benefit for a very short time.

United States Patent 2,927,851 describes the formation of a solid, dry, gelatinous silicate soil-improving and soil-fertilizing product when slag obtained from the process of refining copper ore in a reverberatory furnace is treated with concentrated acids selected from the group consisting of sulfuric acid (having a strength of at least 90%) and phosphoric acid (having a strength greater than 70%) and where water is present with the slag prior to the addition of the concentrated acid, the weight of such water being at most the combined weight of the slag and the acid used. In the reaction the solid, hydrated siliceous gelatinous product is produced within less than a few minutes after the addition of the concentrated acid, and some of the water is evolved from the mixture as a consequence of the exothermic reaction which is produced by bringing said acid together with said slag in the presence of the limited amount of water. Also, water soluble plant nutrients may be dissolved in the water in the above described process before the addition of acid to form a product containing such plant nutrients as part of its total composition.

The present invention also relates to solid, dry, gelatinous hydrous silicate soil-improving and soil-fertilizing products. The products of this invention are formed by treating pulverized slag, obtained from the process of refining copper ore in a reverberatory furnace, with a hot aqueous solution of sulfuric and/or phosphoric acids, said pulverized slag being of a fineness of from about 100 mesh (U.S. Standard Sieve) to about 200 mesh or finer. The instant invention encompasses the mechanical mixing of dry pulverized slag with dry, water-soluble plant nutrients prior to the treatment of the resulting mixture with a hot aqueous solution of sulfuric and/or phosphoric acid.

By the use of sulfuric and/or phosphoric acid, water and heat, water-insoluble slag is converted into a hydrated, solid gel containing within a hydrophilic colloid structure the following named substances: the hydrates of ferrous sulfate, ferrous sulfato acid, calcium and magnesium sulfates, unreacted sulfuric acid combined physically with ferrous sulfate, the gels of silicic acid and aluminum oxide, and trace amounts of other metallic sulfates and oxides derived from the reactions between the metallic elements, i.e., zinc, copper, manganese, boron, and molybdenum, usually found associated with ores from which the slag was derived and sulfuric acid used in the process. When phosphoric acid is employed, in place of sulfate, sulfuric acid derivatives and free sulfuric acid, the resulting product contains hydrates of acid ferrophosphate, calcium and magnesium phosphates, phosphoric acid, and metallic oxides and phosphates of the metallic compounds noted above enveloped in the same type of hydrophilic colloid structure derived by acid hydrolysis of the silicates of the slag and condensation of the silicic acid and aluminum oxide formed in the reaction. In the embodiment of this invention wherein mixtures of sulfuric acid and phosphoric acid are employed, water-insoluble slag is converted into the hydrophilic colloid structure containing mixtures of corresponding metal phosphates and sulfates, oxides, and unreacted acids.

The products made by this invention, by use of the materials noted above, are as useful in each and every manner as are the products produced under the processes disclosed in the Wilson Patent, No. 2,927,851. The products of this invention, when applied to calcareous soils, will not only effect a reduction of soil alkalinity of such treated soils, but will also reduce evaporation-of-water losses from such treated soils and will also reduce transpiration losses from plants growing in such treated soils. In addition, the use of these products will induce soil granulation and enhance soil structures of calcareous soils treated with such products. The gel structure of the products with its high adsorptive qualities holds all the materials which are contained in the mass and which are to be given up to the soil in a state of readiness for slow liberation through progressive decomposition. This also applies to the plant nutrients which may have been added to the slag. Tests conducted with such a product to which such plant nutrients have been added show that only part of these plant nutrients are immediately available while the remainder are available only over extended periods. In the end however 100% of the nutrients are given up to the soil.

The slag, as indicated supra, is obtained from the reverberatory refining of copper. An appreciation of the chemical nature of this slag necessitates understanding of metallurgical processes entailed in the reverberatory refining of copper ore. As most ores subjected to this process are pyritic (sulfide containing) and for the greater part are chalcopyrite—$CuFeS_2$, the slag from their refining contains a large percentage of iron as metallic, as siliceous, and as oxide ($Fe_2O_3$) in addition to the metal oxides and silicates of aluminum, calcium, magnesium, zinc, manganese, lead, copper, boron, and molybdenum. Typical analysis of such slag would be as follows: silicon dioxide—approximately 30%; iron (expressed as metallic)—15% to 35%; calcium, aluminum, magnesium, and manganese (expressed as oxides)—total approximately 16% to 22%; sulfur (as elemental sulfur)—approximately 1%; combined oxygen—approximately 7; zinc, copper, lead, boron, molybdenum (expressed as metallic)—approximately 2% to 4%; said percentages being by weight.

The slag described above exerts strong magnetic properties. Studies have shown the iron content to be present as a combination of iron metal, magnetic iron oxide, and some FeO. The copper slag is cooled in different ways in the refineries. Some copper refineries cool the slag by mixing it with water which produces a very rapid cooling or quenching. The slag of the reverberatory copper refining process may thus be a quenched or a non-quenched slag. The use of quenched or rapidly cooled slag results in a much more rapid reaction during acid treatment.

The physical states of the products obtained by means of quenched or water-cooled slags and non-quenched or air-cooled slags are different, although a chemical analysis of the gel showed no difference. When quenched slag is used, the product forms a light fluffy material. An air-cooled slag however reacts with the acid to produce a more granular product which is compact and for some uses is preferable.

The acid solution employed is an aqueous solution of sulfuric acid, phosphoric acid, or a combination of these acids, the acid concentration ranging from 35% to 70% with the balance being water.

Diammonium phosphate, ammonium sulfate, urea, ammonium hydrogen phosphate, potassium chloride, potassium sulfate, and ethylene diamine tetraacetic acid, are some examples of plant nutrient-containing materials which may be used for the preparation of products in accord with this invention.

In order to prepare the products of the present invention, the ratio of slag/water/acid is most important, and the range of temperature at which the slag is brought into contact (treated) with the acid-water mixture is critical. A temperature between 212° F. (100° C.) and the boiling point of the aqueous acid solution is essential. The resulting products contain a maximum of condensed hydrophilic gel (from silicic acid) with maximum molecular branch structure. Moreover, the level of water of hydration and the level of energy of activation are directly affected by the concentration of hydrogen ions and ionizable water the system.

The concentration of acid in the aqueous acid solution (i.e., water and acid) ranges from 35% to 70%; the temperature at which the slag is contacted with the aqueous acid solution is within the above-specified range, the optimum being in the vicinity of 225° F. for all concentrations of acid within the indicated range; the ratio of slag/acid/water includes ratios from 10/5 to 10/4 to 12, the optimum weight ratio being 1/1/1. The use of weight ratios of, e.g., 10/10/10, 10/9/6, 10/7/3, 10/6/6, 10/6/4, 10/6/9 and 10/5/12, result in products which conform in all respects to the instantly described products. The optimum weight ratio of water to acid in the reaction is 1:1, i.e., a 50% acid solution by weight. When the acid concentration exceeds the concentration of slag in the reaction, the reaction is incomplete; and, although some gel forms, such gel fails to trap and embody all of the acid used, thus resulting in a product which is wet with excess acid and which will not dry even when subjected to elevated temperatures. On the other hand when the concentration of acid in the solution used drops below 35%, the rate of gel formation is lower, and a time period of about 5 minutes is required for gelation to take place. All of the following examples, carried out separately with quenched and with non-quenched slag, result in products having corresponding chemical analyses.

*Example 1*

To one (1) part by weight of slag (pulverized to pass 200 mesh U.S. Std. Sieve) two (2) parts by weight of a solution containing 50% by weight of acid and 50% by weight of water is added. This acid solution, before adidtion to dry, pulverized slag, is heated to 225° F. The acid is sulfuric. The ingredients are intimately mixed by stirring during the rapid addition of the aqueous acid solution. Within less than a time lapse of one (1) minute a solid gelatinous hydrous silicate soil-improving and soil-fertilizing product is formed. This product is comparable in all properties with products produced by Wilson Patent 2,927,851 with the exception that a higher percentage of slag and acid components have entered the reaction, resulting in a higher degree of gel structure, a higher percentage of free and total acid concentration, and a higher percentage of soluble iron salt formation. All of these differences are improvements which could not have been foreseen from the disclosure of said Wilson patent.

Chemical analyses of the product of Example 1 showed an acid concentration, expressed as sulfuric acid ($H_2SO_4$), of 42.6% and a soluble iron content present as ferrous sulfate hydrate, expressed as metallic iron, or 13.9%.

*Example 2*

To one (1) part by weight of slag (pulverized to pass 200 mesh U.S. Std. Sieve) two (2) parts by weight of a solution containing 50% by weight of acid and 50% by weight of water is added. This acid solution, before addition to dry, pulverized slag, is heated to 215° F. The acid is sulfuric acid. The ingredients are intimately mixed by stirring during the rapid addition of the aqueous acid solution. Within less than a time lapse of one (1) minute a solid gelatinous hydrous silicate soil-improving and soil-fertilizing product is formed. This product is comparable in all properties with products produced by Wilson Patent 2,927,851 with the exception that a higher percentage of slag components have entered the reaction, resulting in a higher percentage of gel structure, a higher percentage of free acid concentration, and a higher percentage of soluble iron salt formation.

*Example 3*

To one (1) part by weight of slag (pulverized to pass 200 mesh U.S. Std. Sieve) two (2) parts by weight of a solution containing 50% by weight of acid and 50% by weight of water is added. This acid solution, before addition to dry, pulverized slag, is heated to 240° F. The acid is sulfuric. The ingredients are intimately mixed by stirring during the rapid addition of the aqueous acid solution. Within less than a time lapse of one (1) minute a solid gelatinous hydrous silicate soil-improving and soil-fertilizing product is formed. This product is comparable in all properties with products produced by Wilson Patent 2,927,851 with the exception that a higher percentage of slag components have entered the reaction, resulting in a higher percentage of gel structure, a higher percentage of free acid concentration, and a higher percentage of soluble iron salt formation.

*Example 4*

The processes of Examples 1 to 3 are repeated with phosphoric acid of the same concentration. The resulting products correspond to those indicated for Examples 1 to 3. Variation of the acid concentration from 50% by weight to 35% by weight or to 70% by weight also results in products essentially the same as that described in Example 1.

*Example 5*

The process of Example 1 is repeated with 1 part by weight of the specified slag and 2 parts by weight of a solution containing 25% by weight of sulfuric acid, 25% by weight of phosphoric acid and 50% by weight of water. The resulting product corresponds essentially to that obtained from Example 1.

*Example 6*

35 parts by weight of pulverized slag are mixed with 30 parts by weight of diammonium phosphate in the dry state. To this mixture is added (all at one time) in a rapid manner, 25 parts by weight of a hot (240° F.), aqueous solution of sulfuric acid (40% by weight water and 60% by weight $H_2SO_4$). The combined ingredients are intimately mixed. Within a time period of less than one (1) minute a hydrous, solid gelatinous mixture results. Analysis of this product discloses a concentration of 6.7% nitrogen and 17.3% water soluble $P_2O_5$ present.

The products of this invention reduce loss of moisture from soils by evaporation and reduce plant transpiration losses when said products are used in the treatment of calcareous soils in which the plants are growing. The ability of these products to effect cementation of soil particles and their ability to hold absorbed moisture with great tenacity against the vapor pressure gradient enable them to act as moisture reservoirs when present in the soil. The gradual release of this moisture from the colloidal entities of the hydrophilic system affords a continuous water supply both in the soil proper and to supply the needs of plants which otherwise would be subject to wilt caused by the inability of untreated soil to have a moisture reserve.

It is thought that the invention and its advantages will be understood from the foregoing description, and it is apparent that various changes may be made in the process and the products without departing from the spirit and scope of the invention or sacrificing its material advantages, the process and the products, hereinbefore described, being merely illustrative of preferred embodiments of the invention.

Having described the invention, what is claimed is:

1. A process for making an acidic soil-fertilizing and soil-improving solid hydrated siliceous gelatinous product which comprises intimately mixing dry pulverized slag with a hot aqueous acid solution having an acid concentration of from 35 to 70 percent by weight before the slag is contacted with the acid; said slag being copper refining reverberatory furnace slag, a typical analysis thereof comprising about 30 percent by weight of silicon dioxide, about 15 to 35 percent by weight of iron, a total of approximately 16 to 22 percent by weight of calcium, aluminum, magnesium and manganese (expressed as oxides), approximately 1 percent by weight of sulfur, approximately 7 percent by weight of combined oxygen and approximately 2 to 4 percent by weight of zinc, copper, lead boron and molybdenum; said acid being a member selected from the group consisting of sulfuric acid phosphoric acid and a mixture of sulfuric and phosphoric acids, and said hot aqueous acid solution being at a temperature from about 212° F. to at most the boiling point of the aqueous acid solution, whereby an acidic soil-fertilizing and soil-improving solid hydrated siliceous gelatinous product is produced.

2. A process for making an acidic soil-fertilizing and soil-improving solid hydrated siliceous gelatinous product which comprises intimately mixing 10 parts by weight of pulverized slag with hot aqueous acid solution having an acid concentration of from 35 to 70 percent by weight prior to admixture with the slag; the aqueous solution containing from 5 to 10 parts by weight of acid and from 3 to 12 parts by weight of water; said slag being copper refining reverberatory furnace slag, a typical analysis thereof comprising about 30 percent by weight of silicon dioxide, about 15 to 35 percent by weight of iron, a total of approximately 16 to 22 percent by weight of calcium, aluminum, magnesium and manganese (expressed as oxides), approximately 1 percent by weight of sulfur, approximately 7 percent by weight of combined oxygen and approximately 2 to 4 percent by weight of zinc, copper, lead, boron and molybdenum; said acid being a member selected from the group consisting of sulfuric acid, phosphoric acid and a mixture of sulfuric and phosphoric acids; and said hot aqueous acid solution being at a temperature from about 212° F. to at most the boiling point of the aqueous acid solution, whereby an acidic soil-fertilizing and soil-improving solid hydrated siliceous gelatinous product is produced.

3. A process for making an acidic soil-fertilizing and soil-improving solid hydrated siliceous gelatinous product which comprises: (a) mechanically mixing pulverized slag with dry, water-soluble plant nutrient-containing compound and (b) intimately mixing the resulting product with hot aqueous acid solution having an acid concentration of from 35 to 70 percent by weight prior to the mixing; said slag being copper refining reverberatory furnace slag, a typical analysis thereof comprising about 30 percent by weight of silicon dioxide, about 15 to 35 percent by weight of iron, a total of approximately 16 to 22 percent by weight of calcium, aluminum, magnesium and manganese (expressed as oxides), approximately 1 percent by weight of sulfur, approximately 7 percent by weight of combined oxygen and approximately 2 to 4 percent by weight of zinc, copper, lead, boron and molybdenum; said acid being a member selected from the group consisting of sulfuric acid, phosphoric acid and a mixture of sulfuric and phosphoric acids; and said hot aqueous solution being at a temperature from about 212° F. to at most the boiling point of the aqueous acid solution, whereby an acidic soil-fertilizing and soil-improving solid hydrated siliceous gelatinous product is produced.

4. A process for making an acidic soil-fertilizing and soil-improving solid hydrated siliceous gelatinous product which consists essentially of intimately mixing pulverized slag with hot aqueous sulfuric acid solution at a temperature in the vicinity of 225° F., the weight ratio of slag/acid/water in the resulting mixture being 1/1/1; the concentration of acid in the hot aqueous solution being 50 percent prior to the mixing; the slag being reverberatory furnace copper refining slag; a typical analysis thereof comprising about 30 percent by weight of silicon dioxide, about 15 to 35 percent by weight of iron, a total of approximately 16 to 22 percent by weight of calcium, aluminum, magnesium and manganese (expressed as oxides), approximately 1 percent by weight of sulfur, approximately 7 percent by weight of combined oxygen and approximately 2 to 4 percent by weight of zinc, copper, lead, boron and molybdenum; whereby an acidic soil-fertilizing and soil-improving solid hydrated siliceous gelatinous product is produced.

5. Solid dry acidic granular gelatinous hydrous silicate soil-improving and soil-fertilizing product comprising, within a hydrophilic colloid molecular branch structure, (1) hydrate of ferrous sulfate, (2) ferrous sulfato acid, (3) calcium and magnesium sulfates, (4) unreacted sulfuric acid combined physically with ferrous sulfate, (5) gels of silicic acid and aluminum oxide, and (6) trace amounts of sulfates and oxides which are reaction products of (a) at least one metallic element selected from the group consisting of zinc, copper, manganese, boron and molybdenum and (b) sulfuric acid; the gelatinous product holding the above-defined constituents in a state of readiness for slow liberation through progressive decomposition, being non-toxic to soil, being capable of reducing the alkalinity of soil, being capable of reducing evaporation-of-water loss in soil, being capable of reducing transpiration loss from plants, being capable of inducing soil granulation and being capable of enhancing soil structure; said gelatinous product being the reaction product at an elevated temperature of (a) 10 parts by weight of air-cooled reverberatory furnace copper refining slag, said slag having a typical analysis comprising about 30 percent by weight of silicon dioxide, about 15 to 35 percent by weight of iron, a total of approximately 16 to 22 percent by weight of calcium, aluminum, magnesium and manganese (expressed as oxides), approximately 1 percent by weight of sulfur, approximately 7 percent by weight of combined oxygen and approximately 2 to 4 percent by weight of zinc, copper, lead, boron and molybdenum, (b) from 5 to 10 parts by weight of sulfuric acid and (c) from 3 to 12 parts by weight of water, the elevated temperature being above 212° F. and at most the temperature at which the water and acid admixture boils, the concentration of acid in said water and acid admixture being from 35 to 70 percent prior to contact with the slag, and the slag being of a particle size no coarser than 100 mesh.

6. Solid dry acidic granular gelatinous hydrous silicate soil-improving and soil-fertilizing product comprising, within a hydrophilic colloid molecular branch structure, (1) hydrate of ferrous sulfate, (2) ferrous sulfato acid, (3) calcium and magnesium sulfates, (4) unreacted sulfuric acid combined physically with ferrous sulfate, (5) gels of silicic acid and aluminum oxide, and (6) trace amounts of sulfates and oxides which are reaction products of (a) at least one metallic element selected from the group consisting of zinc, copper, manganese, boron and molybdenum and (b) sulfuric acid; the gelatinous product holding the above-defined constituents in a state of readiness for slow liberation through progressive decomposition, being non-toxic to soil, being capable of reducing the alkalinity of soil, being capable of reducing evaporation-of-water loss in soil, being capable of reducing transpiration loss from plants, being capable of inducing soil granulation and being capable of enhancing soil structure; said gelatinous product being the reaction product at 225° F. of (a) 1 part by weight of air-cooled slag, said slag being reverberatory furnace copper refining slag, a typical analysis of which comprises about 30 percent by weight of silicon dioxide, about 15 to 35 percent by weight of iron, a total of approximately 16 to 22 percent by weight of calcium, aluminum, magnesium and manganese (expressed as oxides), approximately 1 percent by weight of sulfur, approximately 7 percent by weight of combined oxygen and approximately 2 to 4 percent by weight of zinc, copper, lead, boron and molybdenum, (b) 1 part by weight of sulfuric acid and (c) 1 part by weight of water, the sulfuric acid being in solution in the water prior to reaction with the slag, the concentration of the sulfuric acid in solution in said water being 50 percent by weight, and the slag being of a particle size no coarser than 100 mesh.

7. Solid acidic gelatinous hydrous silicate soil-improving and soil-fertilizing product comprising, within a hydrophilic colloid molecular branch structure, (1) hydrate of ferrous sulfate, (2) ferrous sulfato acid, (3) calcium and magnesium sulfates, (4) unreacted sulfuric acid combined physically with ferrous sulfate, (5) gels of silicic acid and aluminum oxide and (6) trace amounts of sulfates and oxides which are reaction products of (a) at least one metallic element selected from the group consisting of zinc, copper, manganese, boron and molybdenum and (b) sulfuric acid; the gelatinous product holding the above-defined constituents in a state of readiness for slow liberation through progressive decomposition, being non-toxic to soil, being capable of reducing the alkalinity of soil, being capable of reducing evaporation-of-water loss in soil, being capable of reducing transpiration loss from plants, being capable of inducing soil granulation and being capable of enhancing soil structure; said gelatinous product being the reaction product at an elevated temperature of (a) one part by weight of pulverized reverberatory furnace copper refining slag, said slag having a typical analysis comprising about 30 percent by weight of silicon dioxide, about 15 to 35 percent by weight of iron, a total of approximately 16 to 22 percent by weight of calcium, aluminum, magnesium and manganese (expressed as oxides), approximately 1 percent by weight of sulfur, approximately 7 percent by weight of combined oxygen and approximately 2 to 4 percent by weight of zinc, copper, lead, boron and molybdenum, and (b) two parts by weight of aqueous sulfuric acid solution, the acid concentration of the aqueous sulfuric acid solution being 50 percent by weight prior to contact with the slag, and the elevated temperature being above 212° F. and at most the temperature at which said aqueous acid solution boils.

8. Solid acidic gelatinous hydrous silicate soil-improving and soil-fertilizing product comprising, within a hydrophilic colloid molecular branch structure, (1) hydrate of ferrous sulfate, (2) ferrous sulfato acid, (3) calcium and magnesium sulfates, (4) unreacted sulfuric acid combined physically with ferrous sulfate, (5) gels of silicic acid and aluminum oxide, (6) trace amounts of sulfates and oxides which are reaction products of (a) at least one metallic element selected from the group consisting of zinc, copper, manganese, boron and molybdenum and (b) sulfuric acid, (7) hydrates of acid ferrophosphate, (8) calcium and magnesium phosphates, (9) phosphoric acid and (10) phosphates which are reaction products of (a) at least one metallic element selected from the group consisting of zinc, copper, manganese, boron and molybdenum and (b) phosphoric acid; the gelatinous product holding the above-defined constituents in a state of readiness for slow liberation through progressive decomposition, being non-toxic to soil, being capable of reducing the alkalinity of soil, being capable of reducing evaporation-of-water loss in soil, being capable of reducing transpiration loss from plants, being capable of inducing soil granulation and being capable of enhancing soil structure; said gelatinous product being the reaction product at an elevated temperature of (a) one part by weight of pulverized reverberatory furnace copper refining slag, said slag having a typical analysis comprising about 30 percent by weight of silicon dioxide, about 15 to 35 percent by weight of iron, a total of approximately 16 to 22 percent by weight of calcium, aluminum, magnesium and manganese (expressed as oxides), approximately 1 percent by weight of sulfur, approximately 7 percent by weight of combined oxygen and approximately 2 to 4 percent by weight of zinc, copper, lead, boron and molybdenum, and (b) two parts by weight of aqueous acid solution, the acid in the aqueous acid solution being a mixture of sulfuric and phosphoric acids, the total acid concentration in said aqueous acid solution being 50 percent by weight prior to contact with the slag, and the elevated temperature being above 212° F. and at most the temperature at which said aqueous acid solution boils.

9. Solid acidic gelatinous hydrous silicate soil-improving and soil-fertilizing product comprising, within a hydrophilic colloid molecular branch structure, (1) hydrate of acid ferrophosphate, (2) calcium and magnesium phosphates, (3) phosphoric acid and (4) metallic oxides and phosphates which are reaction products of (a) at least one metallic element selected from the group consisting of zinc, copper, manganese, boron and molybdenum and (b) phosphoric acid; the gelatinous product holding the above-defined constituents in a state of readiness for slow liberation through progressive decomposition, being non-toxic to soil, being capable of reducing the alkalinity of soil, being capable of reducing evaporation-of-water loss in soil, being capable of reducing transpiration loss from plants, being capable of inducing soil granulation and being capable of enhancing soil structure; said gelatinous product being the reaction product at an elevated temperature of (a) one part by weight of pulverized reverberatory furnace copper refining slag, said slag having a typical analysis comprising about 30 percent by weight of silicon dioxide, about 15 to 35 percent by weight of iron, a total of approximately 16 to 22 percent by weight of calcium, aluminum, magnesium and manganese (expressed as oxides), approximately 1 percent by weight of sulfur, approximately 7 percent by weight of combined oxygen and approximately 2 to 4 percent by weight of zinc, copper, lead, boron and molybdenum, and (b) two parts by weight of aqueous phosphoric acid solution, the acid concentration of the aqueous phosphoric acid solution being 50 percent by weight prior to contact with the slag, and the elevated temperature being above 212° F. and at most the temperature at which said aqueous acid solution boils.

(References on following page)

References Cited in the file of this patent

UNITED STATES PATENTS

| | | |
|---|---|---|
| 238,240 | Lippincott | Mar. 1, 1881 |
| 2,288,874 | Anderson | July 7, 1942 |
| 2,532,548 | Heide | Dec. 5, 1950 |
| 2,927,851 | Wilson | Mar. 8, 1960 |

OTHER REFERENCES

Scharrer, K.: "Versuche über die Brauchbarkeiteiner in der Norddeutschen Affinerie Hamburg anfallenden Kupferschlacke Als-Dungemittel," Chemisches Zentral Blatt, 113.JG. July-Aug. 1942, II, p. 706. (Copy in Scientific Library, $QD1.C_7$.)

Butts: Copper, pp. 139–148, Reinhold Pub. Corp., New York, N.Y., 1954. (Copy in Scientific Library, TN 780.B87.)

Hofman: Metallurgy of Copper, p. 383, Table 94, McGraw-Hill, 1914. (Copy in Scientific Library, TN 780.H5.)

Mellor: "Comprehensive Treatise on Inorganic and Theoretical Chemistry," vol. 14, p. 273. (Copy in Scientific Library, QD 31 M4.) Longmans, Green & Co., 1935.